United States Patent [19]
Buse

[11] Patent Number: 5,927,860
[45] Date of Patent: Jul. 27, 1999

[54] BUTTONS FOR PRODUCT LUBRICATED THRUST BEARINGS

[75] Inventor: Frederic W. Buse, Allentown, Pa.

[73] Assignee: Ingersoll-Dresser Pump Company, Liberty Corner, N.J.

[21] Appl. No.: 08/961,865

[22] Filed: Oct. 31, 1997

[51] Int. Cl.⁶ ................................................. F16C 17/06
[52] U.S. Cl. ........................ 384/122; 384/285; 384/308
[58] Field of Search ........................ 384/122, 124, 384/282, 284, 285, 303, 306, 308, 309, 312

[56] References Cited

U.S. PATENT DOCUMENTS

| | | | |
|---|---|---|---|
| 3,544,177 | 12/1970 | Tallian et al. | 384/620 X |
| 4,468,138 | 8/1984 | Nagel | 384/303 |
| 5,393,145 | 2/1995 | Ide | 384/124 |
| 5,599,109 | 2/1997 | Negwer | 384/303 X |
| 5,716,143 | 2/1998 | Browne et al. | 384/282 X |

*Primary Examiner*—Thomas R. Hannon
*Attorney, Agent, or Firm*—Robert F. Palermo

[57] ABSTRACT

A thrust bearing, for axially supporting a rotating member, includes a flat circular disk-shaped bearing body having a central axial bore and a plurality of axial cavities surrounding the central axial bore and a plurality of bearing elements releasably retained, one in each cavity, and axially projecting from the axial surface of the bearing body. The bearing elements are axially reversible and may be provided for rotationally handed or unhanded use.

12 Claims, 2 Drawing Sheets

BUTTONS FOR PRODUCT LUBRICATED THRUST BEARINGS

BACKGROUND OF THE INVENTION

This invention relates generally to product lubricated pump bearings and more particularly to product lubricated thrust bearings with reversible button inserts for wearing surfaces of such bearings.

Product lubrication of bearings in pumps, i.e., lubrication of the bearings of the pump using the pumped fluid, is a desirable feature; because it permits design of pumps without separate lubrication systems and their associated equipment and with no mechanical seals to protect such bearings from the pumped fluid. When pumping clean and lubricious fluids, selection of the bearing materials is relatively simple. However, when pumping dirty fluids, non-lubricious fluids, or dirty and non-lubricious fluids, the bearing materials must be capable of withstanding abrasion and/or frictional heating without deterioration.

Thus, suitable materials are often expensive, difficult to fabricate, and fragile. Because of these drawbacks, product lubrication of bearings is not employed to the fullest extent possible, and lower quality and durability must be tolerated in the interest of practicality and short term economy.

The foregoing illustrates limitations known to exist in present pump bearings. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a thrust bearing, for axially supporting a rotating member, comprising a flat circular disk-shaped bearing body having a central axial bore and a plurality of axial cavities surrounding the central axial bore and a plurality of bearing elements releasably retained, one in each cavity, and axially projecting from the axial surface of the bearing body.

The foregoing and other aspects will become apparent from the following detailed description of the invention when considered in conjunction with the accompanying drawings.

DETAILED DESCRIPTION

Figure 1:
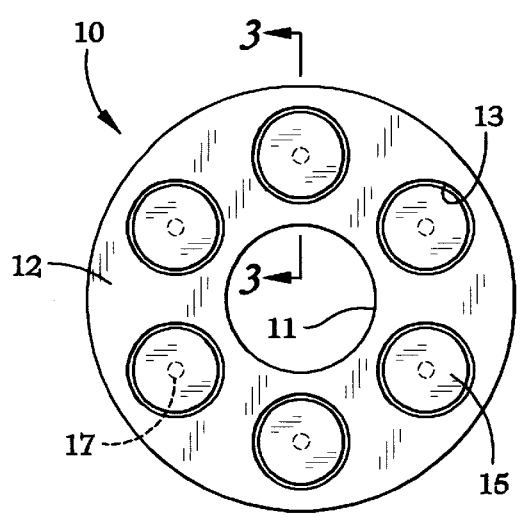
FIG. 1 is an axial view of one embodiment of a thrust bearing according to the invention.

The first embodiment of the thrust bearing of the invention is shown in FIGS. 1, 3, 4a, and 4b, in which a thrust bearing 10 is shown as a disk-shaped bearing body 12 with a central axial bore 11. The bearing body 12 has a plurality of axial cylindrical cavities 13 surrounding the bore 11. Six such cavities are shown, but the number may vary, depending upon the size and service requirements of the thrust bearing. At the center of each cavity 13 is a small hole 17, through which a rod may be inserted to assist in removing an axially symmetrical cylindrical bearing element 15 which is normally retained in the cavity 13. This axial symmetry permits reversal of the bearing element 15 during maintenance, if the element is worn or damaged on its front face.

The bearing element 15 is, preferably, retained in the cavity 13 by a resilient o-ring 19 fitted in a groove 18 in the wall of the cavity 13. Alternatively, the o-ring 19 could be in a groove (not shown) on the outer surface of the bearing element 15, and the wall of the cavity 13 could be smooth. The choice is determined by manufacturing considerations such as the hardness of the bearing elements and the relative difficulty of forming grooves in such hard elements. Retention by the resilient o-ring 19 permits the bearing element 15 to adjust to accommodate slight misalignments of the thrust bearing and the supported surface. During removal of the bearing element 15 from the bearing body 12, a rod is inserted through the hole 17 in the cavity 13 to push out the bearing element. Insertion of the bearing element 15 merely requires an axial push to slightly compress the o-ring 19 and to seat the bearing element against the bottom of the cavity 13. Thus, in this embodiment, replacement of bearing elements 15 is quickly and simply accomplished.

Since the bearing elements 15 are cylindrical and axially symmetrical, they are inexpensive to manufacture no matter what material is required for the intended service. Thus bearing elements 15 can be made from soft and lubricious polymers, hard polymers, carbon, metals, ceramics, or carbides by relatively simple manufacturing processes. The bearing body 12 is, preferably, made from a corrosion resistant material such as stainless steel in order to provide a long service life.

Figure 2A:
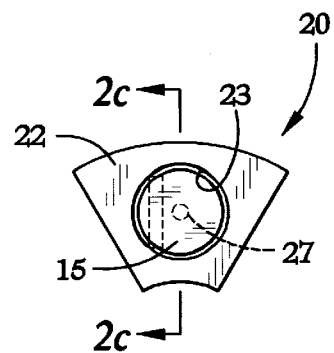
FIGS. 2a, 2b, and 2c are an axial front view, an axial rear view, and a transverse cross-sectional view, respectively, of one segment of a bearing body for another embodiment of the invention.
Figure 2B:
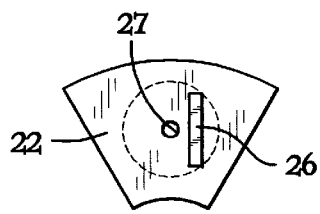
Figure 2C:
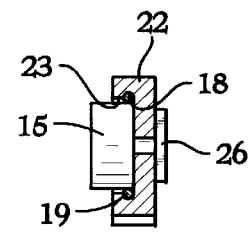
Figure 3:
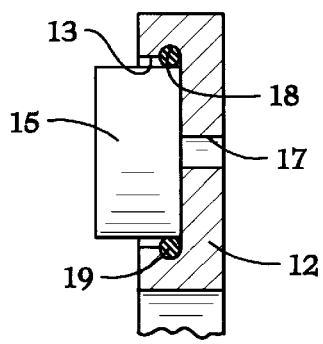
FIG. 3 is a fragmentary cross-sectional side view of the thrust bearing of FIG. 1.
Figure 4A:
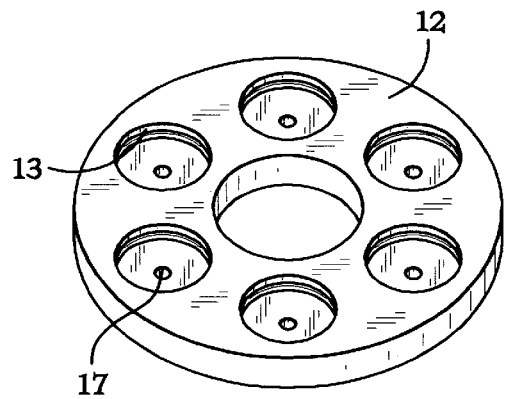
FIGS. 4a and 4b are perspective views of a bearing body and a bearing element, respectively, of the thrust bearing of FIG. 1.
Figure 4B:
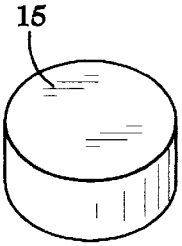

A second embodiment of the thrust bearing is shown in FIGS. 2a, 2b, and 2c. A thrust bearing segment 20 has a edge-shaped bearing body segment 22 which is designed to fit with a number of identical segments 22 around a shaft to provide axial support to a rotating member. The segments 20 may be loosely keyed, to permit slight alignment variations while intermeshing at their edges to form a stable disk-shaped assembly. The bearing body segment 22 has a cavity 23 for receiving and retaining a bearing element 15. The bearing element is retained by an o-ring 19 in the groove 18 in the wall of the cavity 23. Because of its segmented design, the bearing body segment 22 of this embodiment requires a rocking arm 26, which may be a hardened protrusion on its back surface or a separate shim retained against the back surface, to tilt in a direction opposite to the direction of rotation to form a hydraulic wedge. Left hand or right hand designs are provided, as dictated by the rotational handing of the installation. The hole 27 has the same disassembly purpose in this embodiment as described above. Except for its segmented construction and the required rocking arm provision, this embodiment is identical to the first described embodiment, above.

Figure 5:
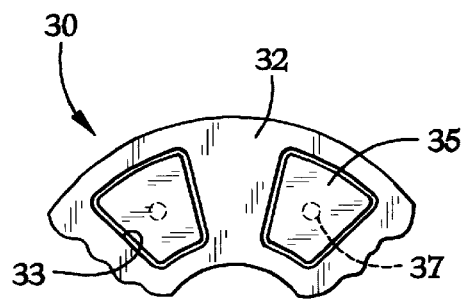
FIG. 5 is a fragmentary axial front view of a third embodiment of the thrust bearing of the invention.

The thrust bearing 32, illustrated in FIG. 5, is similar in all respects to that in FIG. 1 with the exception of the shape of the cavities 33 and the bearing elements 35. The plurality of cavities 33 and bearing elements 35 are symmetrically shaped, and their size and number is determined by the size and load requirements of the application. Hole 37 has the same purpose as in the previously described embodiments.

Figure 6A:
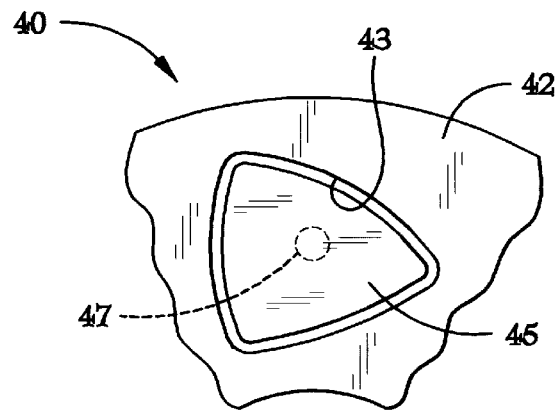
FIGS. 6a and 6b are left hand and right hand versions, respectively, of a fourth embodiment of the invention.
Figure 6B:
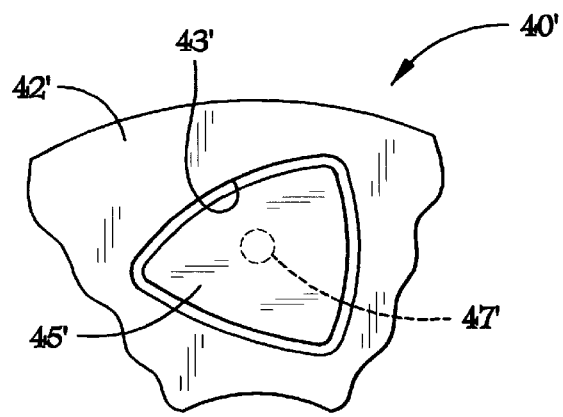

FIGS. 6a and b show left hand and right hand versions, respectively, of an embodiment similar to that of FIG. 1. In this case, the rotational handing of the thrust bearing 40, 40' is addressed by the shape of the bearing elements 45, 45' in the matching cavities 43, 43'. Holes 47, 47' are the same as in the previous embodiments. In this embodiment the bearing elements 45, upon reversal may be used in the oppositely handed cavities 43', and vice versa due to their similar but oppositely-handed forms.

In all cases, but especially for the non-cylindrical shaped cavities and bearing elements, it may be advantageous to retain the bearing elements 15, 35, 45, 45' in the cavities 13, 23, 33, 43, 43' using resilient nibs (not illustrated) projecting from recesses in the walls of the cavities, rather than continuous o-rings in o-ring grooves.

The bearing elements are sized to be a sliding fit in the cavities in all embodiments in order to minimize sidewards movements of the elements in the cavities. This also permits retention by resilient members having minimal protrusion from the cavity walls, and it also discourages collection of dirt and wear particles in the close space between the elements and the cavities.

Having described the invention, I claim:

1. A thrust bearing, for providing axial support to a rotating member, comprising:
   a flat circular disk-shaped bearing body having a central axial bore and a plurality of axial cavities surrounding said central axial bore, said bearing body comprising a plurality of wedge-shaped segments which fit together to form the flat circular disk-shaped bearing body, each said wedge-shaped segment having at least one said axial cavity; and
   a plurality of bearing elements releasably retained, one in each cavity, and axially projecting from the axial surface of the bearing body.

2. The thrust bearing of claim 1, wherein said plurality of axial cavities are cylindrical, and said bearing elements are also cylindrical.

3. The thrust bearing of claim 1, wherein said bearing elements are releasably retained in said cavities by resilient elements protruding from recesses in walls of said cavities.

4. The thrust bearing of claim 1, wherein said bearing body is made from a corrosion resistant metal alloy.

5. The thrust bearing of claim 1, wherein said bearing elements are made from silicon carbide.

6. The thrust bearing of claim 1, wherein said bearing elements are made from a hard metal.

7. The thrust bearing of claim 1, wherein said bearing elements are made from a ceramic material.

8. The thrust bearing of claim 1, wherein said bearing elements are made from a polymeric material.

9. The thrust bearing of claim 1, wherein said bearing elements are axially reversible.

10. The thrust bearing of claim 1, further comprising:
    a small axial hole through said flat circular disk-shaped bearing body in each said cavity for insertion of a tool for pushing said bearing element out of said cavity.

11. A thrust bearing, for axially supporting a rotating member, comprising:
    a flat circular disk-shaped bearing body having a central axial bore and a plurality of axial cavities surrounding said central axial bore, said flat circular disk-shaped bearing body comprising a plurality of wedge-shaped segments which fit together to form the bearing body, each said wedge-shaped segment having at least one said axial cavity and having means, on a rear face thereof, for causing said segment to tilt in a direction opposite to the direction of rotation; and
    a plurality of bearing elements releasably retained, one in each cavity, and axially projecting from the axial surface of the bearing body.

12. The thrust bearing of claim 11, wherein said bearing elements are releasably retained in said cavities by resilient o-rings in circumferential grooves in walls of said cavities.

* * * * *